United States Patent
Wang et al.

(10) Patent No.: US 10,512,100 B2
(45) Date of Patent: Dec. 17, 2019

(54) USER DEVICE-REQUESTED DOWNLINK PILOTS

(71) Applicant: Google LLC, Mountain View, CA (US)

(72) Inventors: Jibing Wang, Saratoga, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 32 days.

(21) Appl. No.: 15/895,540

(22) Filed: Feb. 13, 2018

(65) Prior Publication Data
US 2019/0254054 A1 Aug. 15, 2019

(51) Int. Cl.
| | |
|---|---|
| *H04W 72/12* | (2009.01) |
| *H04L 5/00* | (2006.01) |
| *H04L 25/02* | (2006.01) |
| *H04W 72/04* | (2009.01) |
| *H04L 1/18* | (2006.01) |

(52) U.S. Cl.
CPC ....... *H04W 72/1284* (2013.01); *H04L 5/0051* (2013.01); *H04L 5/0053* (2013.01); *H04L 25/0224* (2013.01); *H04W 72/1289* (2013.01); *H04L 1/1887* (2013.01); *H04W 72/0413* (2013.01)

(58) Field of Classification Search
None
See application file for complete search history.

(56) References Cited

U.S. PATENT DOCUMENTS

| | | | | |
|---|---|---|---|---|
| 7,414,989 | B2 * | 8/2008 | Kuchibhotla | H04L 1/1671 370/329 |
| 8,483,168 | B2 * | 7/2013 | Ji | H04W 36/00835 370/329 |
| 8,565,138 | B1 * | 10/2013 | Yuan | H04W 72/1263 370/312 |
| 8,711,879 | B2 * | 4/2014 | Kato | H04L 1/0026 370/468 |
| 2007/0070944 | A1 * | 3/2007 | Rinne | H04B 7/0669 370/329 |
| 2009/0303937 | A1 * | 12/2009 | Sawahashi | H04L 5/0064 370/329 |
| 2014/0241327 | A1 * | 8/2014 | Yang | H04W 52/146 370/336 |
| 2016/0285533 | A1 * | 9/2016 | Li | H04B 7/0626 |
| 2017/0163404 | A1 * | 6/2017 | Liu | H04L 5/14 |
| 2017/0367062 | A1 * | 12/2017 | Patel | H04B 17/364 |

* cited by examiner

*Primary Examiner* — Shripal K Khajuria
(74) *Attorney, Agent, or Firm* — Colby Nipper PLLC (57) ABSTRACT

The present disclosure describes methods and apparatuses for user device-requested downlink pilots. Downlink pilots can be used by the user device to estimate a channel over which the user device receives data from a base station, thus improving error rates for decoding the data. Some examples of downlink pilots include demodulation reference signals (DM-RS), channel state reference signals (CS-RS), or sounding reference signals (SRS). By enabling the user device to request downlink pilots, the base station can transmit downlink pilots that are customized to provide reference signals with desired characteristics, such as positions within a frequency-time domain of the channel over which the user device receives data from the base station. The customized downlink pilots can enable the user device to better use reference signals to successfully receive and decode data from the base station.

24 Claims, 10 Drawing Sheets

USER DEVICE-REQUESTED DOWNLINK PILOTS

BACKGROUND

Wireless communication from a user device relies on a connection between the user device and a network node, such as a base station of a wireless network provider. With advances in wireless standards and a demand for increased bandwidth for transmitting and receiving data, wireless network providers are transitioning toward advanced protocols such as a 5th generation new radio (5G NR) protocol. These advanced protocols allow for increased bandwidth by utilizing technologies such as beamforming, spatial layers of signals, and components for communication at high frequencies. Additionally, some advanced protocols allow for customized and dynamic communication channels, which provide flexibility for managing the wireless connection.

However, some of the technologies that allow for increased bandwidth provide other challenges. For example, beamforming relies on training the user device and the base station to estimate channel characteristics in order to communicate effectively. Additionally, high-frequency communications are more susceptible to interference from, and reflection off of, objects positioned between the user device and the base station.

SUMMARY

This document describes techniques for, and systems that enable, user device-requested downlink pilots. Downlink pilots can be used by the user device to estimate a channel over which the user device receives data from a base station, thus improving error rates for decoding the data. Some examples of downlink pilots include demodulation reference signals (DM-RS), channel state reference signals (CS-RS), or sounding reference signals (SRS). By enabling the user device to request downlink pilots, the base station can transmit downlink pilots that are customized to provide reference signals with desired characteristics, such as positions within a frequency-time domain of the channel over which the user device receives data from the base station. The customized downlink pilots can enable the user device to better use reference signals to successfully receive and decode data from the base station.

In some aspects, a user device receives, via a transceiver of the user device and over a wireless connection, a downlink schedule for receiving data from a base station. Based at least in part on the downlink schedule, the user device determines a requested downlink pilot schedule. The requested downlink pilot schedule is to be requested for transmission within a portion of data to be received from the base station. The user device then transmits, via the transceiver and over the wireless connection, an indication of the requested downlink pilot schedule. For example, the indication of the requested downlink pilot schedule may include encrypted data that represents the requested downlink pilot schedule when decrypted by the base station. Using the transceiver, the user device receives, over the wireless connection, the portion of the data including downlink pilots on a downlink pilot schedule that is based at least in part on the indication of the requested downlink pilot schedule. The user device can then use the downlink pilots for decoding the portion of the data.

In other aspects, the user device receives first data, including a first set of downlink pilots, from a base station. The first data is received via a hardware-based transceiver and over a wireless connection. The user device decodes the first data based on the first set of downlink pilots, with the decoding being unsuccessful for a portion of the first data. Using the transceiver, the user device transmits an indication of a requested downlink pilot schedule over the wireless connection to a base station. The requested downlink pilot schedule is based at least in part on the decoding being unsuccessful for the portion of the first data. The user device then receives, via the transceiver, the second data over the wireless connection from the base station. The second data includes a second set of downlink pilots on a downlink pilot schedule that is based at least in part on the indication of the requested downlink pilot schedule. The user device can then use the second set of downlink pilots for decoding the second data.

In further aspects, a base station establishes a wireless connection with a user device via a transceiver of the base station. The base station receives, from the user device, an indication of a requested downlink pilot schedule. Based at least in part on the indication of the requested downlink pilot schedule, the base station determines a transmission downlink pilot schedule. The base station then transmits, via the transceiver, data to the user device, with the data including downlink pilots based on the transmission downlink pilot schedule.

The details of one or more implementations are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects of user device-requested downlink pilots for wireless networks is described below. The use of the same reference numbers in different instances in the description and the figures may indicate like elements.

DETAILED DESCRIPTION

Wireless connections between user devices and base stations use downlink pilots to assist the user device in decoding data in downlink transmissions. Conventional wireless networks transmit downlink pilots on a fixed schedule in a frequency-time domain. However, a user device may not properly receive a downlink pilot, which can lead to errors in decoding accompanying data. Additionally, the user device may benefit from receiving downlink pilots at different positions or densities in the frequency-time domain.

This document describes techniques and systems for user device-requested downlink pilots to improve effectiveness of downlink pilots in a wireless network. These techniques may include a user device that transmits a requested downlink pilot schedule to a base station that in turn transmits data with a downlink pilot schedule that is based on the request. For example, a user device receives application data from a base station over a physical downlink share channel (PDSCH) of a wireless connection. The application data includes pilots to assist the user device in decoding, including demodulating, the application data. Upon decoding the application data based on the downlink pilots, the user device determines a new downlink pilot schedule that is customized to the needs of the PDSCH based on the decoding. For example, the user device may determine that additional downlink pilots would improve its estimation of the PDSCH. The user device may then determine if the additional downlink pilots should increase a density of downlink pilots over communication resources in a time domain, a frequency domain, or both. Additionally or alternatively, the user device may determine that additional downlink pilots should be transmitted over different spatial layers of the communication resources or at modified transmission power levels.

The new downlink pilot schedule is transmitted by the user device to the base station as a requested downlink pilot schedule for the base station to be used in customizing a transmission downlink pilot schedule for future transmissions of data. The user device may transmit the requested downlink pilot schedule to the base station over a communication channel such as a physical uplink control channel (PUCCH). The base station then transmits additional data to the user device that includes downlink pilots on the transmission downlink pilot schedule to improve decoding of data by the user device.

The following discussion describes an operating environment and techniques that may be employed in the operating environment and/or network environment. In the context of the present disclosure, reference is made to the operating environment or networking environment by way of example only.

Operating Environment

Figure 1:
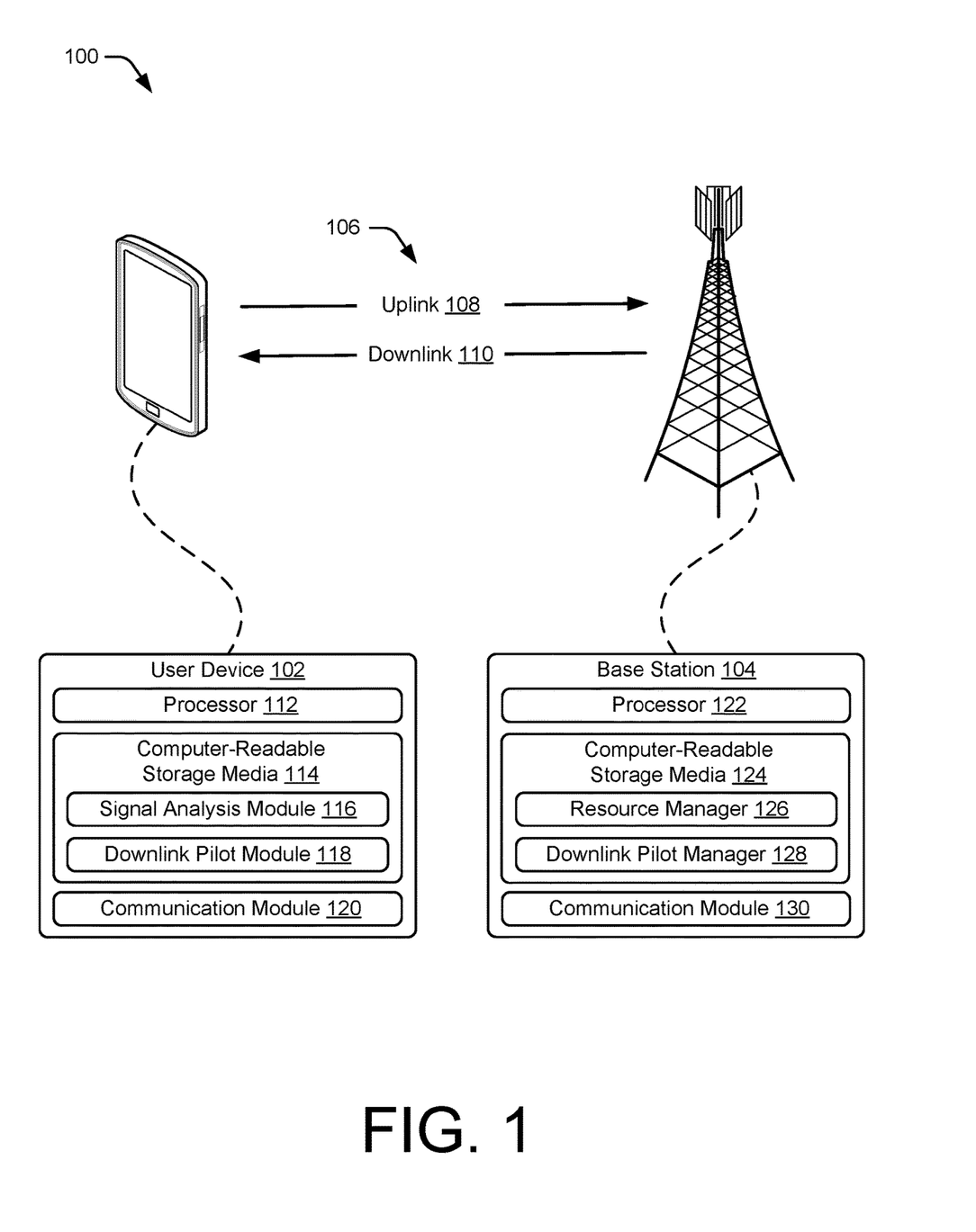
FIG. 1 illustrates example device configurations of a user device and a base station in accordance with one or more aspects of user device-requested downlink pilots.

FIG. 1 illustrates an example operating environment 100 in which devices for user device-requested downlink pilots can be implemented. In this example, the operating environment includes a user device 102 and a base station 104 that are respectively configured to communicate over a wireless connection 106 of a wireless network. Generally, the wireless connection 106 includes an uplink 108 by which the user device 102 transmits data to the base station 104 and a downlink 110 by which the base station 104 transmits other data to the user device 102. Although shown or described with reference to a separate uplink 108 or downlink 110, communication between the user device 102 and base station 104 may also be referenced as a wireless association, a frame exchange, a wireless link, or a communication link.

The wireless connection 106 may be implemented in accordance with any suitable protocol or standard, such as a Global System for Mobile Communications (GSM), Worldwide Interoperability for Microwave Access (WiMax), a High Speed Packet Access (HSPA), Evolved HSPA (HSPA+) protocol, a long term evolution (LTE) protocol (e.g., 4G), an LTE Advanced protocol, or a 5th generation new radio (5G NR) protocol. The wireless connection 106 may operate over a high bandwidth, such as a bandwidth greater than 1 GHz. Further, the wireless connection 106 may operate at high frequencies, such as frequencies above 3 GHz. More specifically, the wireless connection 106 may operate at frequencies above 3.5 GHz, 5 GHz, 10 GHz, or 20 GHz. When operating at high-frequencies, estimating the channel over which communication is performed may be particularly important, based on interference and propagation loss, to provide adequate information for the user device 102 to estimate one or more channels of the wireless connection 106 and reduce error rates in decoding data received via the one or more channels.

The user device 102 includes a processor 112, computer-readable storage media 114 having a signal analysis module 116 and a downlink pilot module 118, and a communication module 120. The user device 102 is illustrated as a smart phone, however the user device may instead be implemented as any device with wireless communication capabilities, such as a mobile gaming console, a tablet, a laptop, an advanced driver assistance system (ADAS), a point-of-sale (POS) terminal, a health monitoring device, a drone, a camera, a media-streaming dongle, a wearable smart-device, an internet-of-things (IoT) device, a personal media device, a navigation device, a mobile-internet device (MID), a wireless hotspot, a femtocell, or a broadband router.

The processor 112 of the user device 102 can execute processor-executable instructions or code stored by the computer-readable storage media (CRM) 114 to cause the user device 102 to perform operations or implement various device functionalities. In some cases, the processor 112 is implemented as an application processor (e.g., multicore processor) or a system-on-chip with other components of the user device integrated therein. The CRM 114 may include any suitable type of memory media or storage media, such as read-only memory (ROM), programmable ROM (PROM), random access memory (RAM), static RAM (SRAM), or Flash memory. In the context of this discussion, the CRM 114 of the user device 102 is implemented as hardware-based storage media, which does not include transitory signals or carrier waves. In some cases, the CRM 114 stores one or more of firmware, an operating system, or applications of the user device 102 as instructions, code, or information. The instructions or code can be executed by the processor 112 to implement various functionalities of the user device 102, such as those related to network access or audio encoding features. In this example, the CRM 114 also stores processor-executable code or instructions for implementing one or more of the signal analysis module 116 or the downlink pilot module 118 of the user device 102.

In some aspects, the signal analysis module 116 may analyze data packets of data received over the wireless connection 106. The signal analysis module 116 uses downlink pilots received with the data to decode the data packets. As part of the decoding, the signal analysis module 116 determines which of the data packets were successfully decoded and which of the data packets were unsuccessfully decoded. Based on the analysis of the signal analysis module 116, the downlink pilot module 118 determines a downlink pilot schedule to be requested from the base station 104 to improve decoding error rates for future transmissions.

The requested downlink pilot schedule may request additional pilots, fewer pilots, or a same quantity of pilots. For example, additional pilots may be requested to improve estimation of a channel over which the data is received. Alternatively, fewer downlink pilots may be requested to make available additional resources for receiving application data over the downlink 110. Additionally or alternatively, the user device 102 may request that the base station 104 transmits the downlink pilots over different resources. The user device 102 may request one or more of particular resources, time or frequency ranges of resources, spatial layers, a time-domain density, or a frequency-domain density for transmitting the downlink pilots.

In some implementations, the user device 102 requests that the base station 104 transmits the downlink pilots with a specified power level. For example, upon unsuccessfully receiving a downlink pilot, the user device 102 may request that the base station transmits the downlink pilot with a higher power level. However, increasing a power level of the downlink pilot can cause a decreased power level for transmitting data being piloted by the downlink pilot. Therefore, in some implementation, the user device 102 may request that the base station 104 reduce a power level of a transmission of the downlink pilot to allow for an increased power level for transmitting data being piloted by the downlink pilot. Some requested downlink pilot schedules may request increasing transmission power of one or more downlink pilots and decreasing transmission power of one or more other downlink pilots. For example, the user device 102 may request an increased transmission power for downlink pilots at positions in the frequency-time domain that have high interference. The user device 102 may request a decreased transmission power for downlink pilots at positions in the frequency-time domain that have low interference.

The requested downlink pilot schedule is transmitted to the base station 104 using the communication module 120. The communication module 120 of the user device 102 includes a hardware-based transceiver and associated circuitry or other components for communicating with the base station 104 via a wireless medium. For example, the communication module 120 may transmit, via a transmitter of the transceiver, data to the base station 104 via one or more channels of the uplink 108. This data transmitted to the base station 104 may include any suitable type of framed or packetized information, such as a device location, a sounding reference signal (SRS), a PRACH communication, device status information, wireless connection status information, wireless connection control information, data requests, data, or network access requests. The communication module 120 may also receive, via a receiver of the transceiver, other data from the base station 104, such as application data, a DM-RS, a CS-RS, a downlink schedule, an uplink schedule, wireless connection configuration settings, network control information, or a communication mode selection.

In this example, the base station 104 is shown generally as a cellular base station of a wireless network. The base station 104 may be implemented to manage a cell of a wireless network that includes multiple other base stations that each manage another respective cell of the wireless network. As such, the base station 104 may communicate with a network management entity or others of the multiple base stations to coordinate connectivity or hand-offs of mobile stations within or across the cells of the wireless network. The base station 104 can be configured as any suitable type of base station or network management node, such as a Global System for Mobile Communications (GSM) base station, a node base (Node B) transceiver station (e.g., for UMTS), an evolved NodeB (eNB, e.g., for LTE), or a next generation Node B (gNB, e.g., for 5G NR). As such, the base station 104 may control or configure parameters of the uplink 108 or the downlink 110 in accordance with one or more of the wireless standards or protocols described herein.

The base station 104 includes a processor 122, a computer-readable storage media (CRM) 124 having a resource manager 126 and a downlink pilot manager 128, and a communication module 130. The processor 122 can execute processor-executable instructions or code stored by the CRM 124 to perform operations or implement various base station functionalities. In some cases, the processor 122 is implemented as multiple processor cores or a multicore processor configured to execute firmware or an operating system of the base station 104. The CRM 124 may include any suitable type of memory media or storage media, such as ROM, PROM, RAM, SRAM, or Flash memory. In the context of this discussion, the CRM 124 is implemented as hardware-based storage media, which does not include transitory signals or carrier waves. The CRM 124 of the base station 104 may store firmware, an operating system, or applications of the base station as instructions, code, or other information. The instructions or code can be executed by the processor 122 to implement various functionalities of the base station 104, such as to manage connectivity or parameters of the wireless connection 106 with the user device 102. In this example, the CRM 124 also stores processor-executable code or instructions for implementing the resource manager 126 and the downlink pilot manager 128 of the base station 104.

In some aspects, the resource manager 126 of the base station 104 is implemented to perform various functions associated with allocating physical access (e.g., resource blocks) or communication resources available to the base station 104. The physical access, such as an air interface of the base station 104, may be partitioned or divided into various units (e.g., frames) of one or more of bandwidth, time, symbols, or layers. For example, within a framework of a 5G NR protocol, the resource manager 126 can allocate bandwidth and time intervals of access in resource blocks, each of which may be allocated in whole, or in part, to one or more channels for communicating with the user device 102. The resource blocks may include multiple subcarriers, each of which spans a portion of a frequency domain of the resource blocks. The subcarriers may be further divided into resource elements, each of which spans a portion of a time domain of the subcarriers. Consequently, a resource block includes multiple resource elements that can be grouped into subcarriers with other resource elements having a common frequency.

The downlink pilot manager 128 receives the assignment of resources from the resource manager 126 and determines a transmission downlink pilot schedule for dedicating resources to downlink pilots. As discussed above, the transmission downlink pilot schedule may be based in part on a requested downlink pilot schedule as indicated by the user device 102. In some implementations, the downlink pilot manager 128 adopts the requested downlink pilot schedule as the transmission downlink pilot schedule. Alternatively, the downlink pilot manager 128 may generate the transmission downlink pilot schedule by modifying the requested downlink pilot schedule based on scheduling constraints or other considerations. The base station 104 then transmits data including downlink pilots according to the downlink pilot schedule. This transmission may occur at a specified time interval after the user device 102 transmits the requested downlink pilot schedule. For example, this transmission may occur 4 time slots after the user device 102 transmits the requested downlink pilot schedule.

Additionally or alternatively, the base station 104 may transmit one or more of the downlink pilots with a pilot sequence that is scrambled with a user device identity. In these implementations, a key for unscrambling the pilot sequence may be previously shared between the user device 102 and the base station 104.

The communication module 130 of the base station 104 includes a receiver, a transmitter, and associated circuitry or other components for communicating with the user device 102 via the wireless medium. The communication module 130 may be configured to communicate over a frequency range of the wireless medium and over multiple spatial layers. In some cases, the communication module 130 includes, or is coupled with, multiple hardware-based transceivers and antenna arrays that are configured to establish and manage wireless connections with multiple user devices. The communication module 130 may also use the antenna arrays to beamform one or more of the uplink 108 or the downlink 110. The base station 104 may communicate any suitable data or information to the user device 102 through the downlink 110, such as a schedule of allocated resources, downlink pilots, application data, wireless connection status information, or wireless connection control information.

Figure 2:
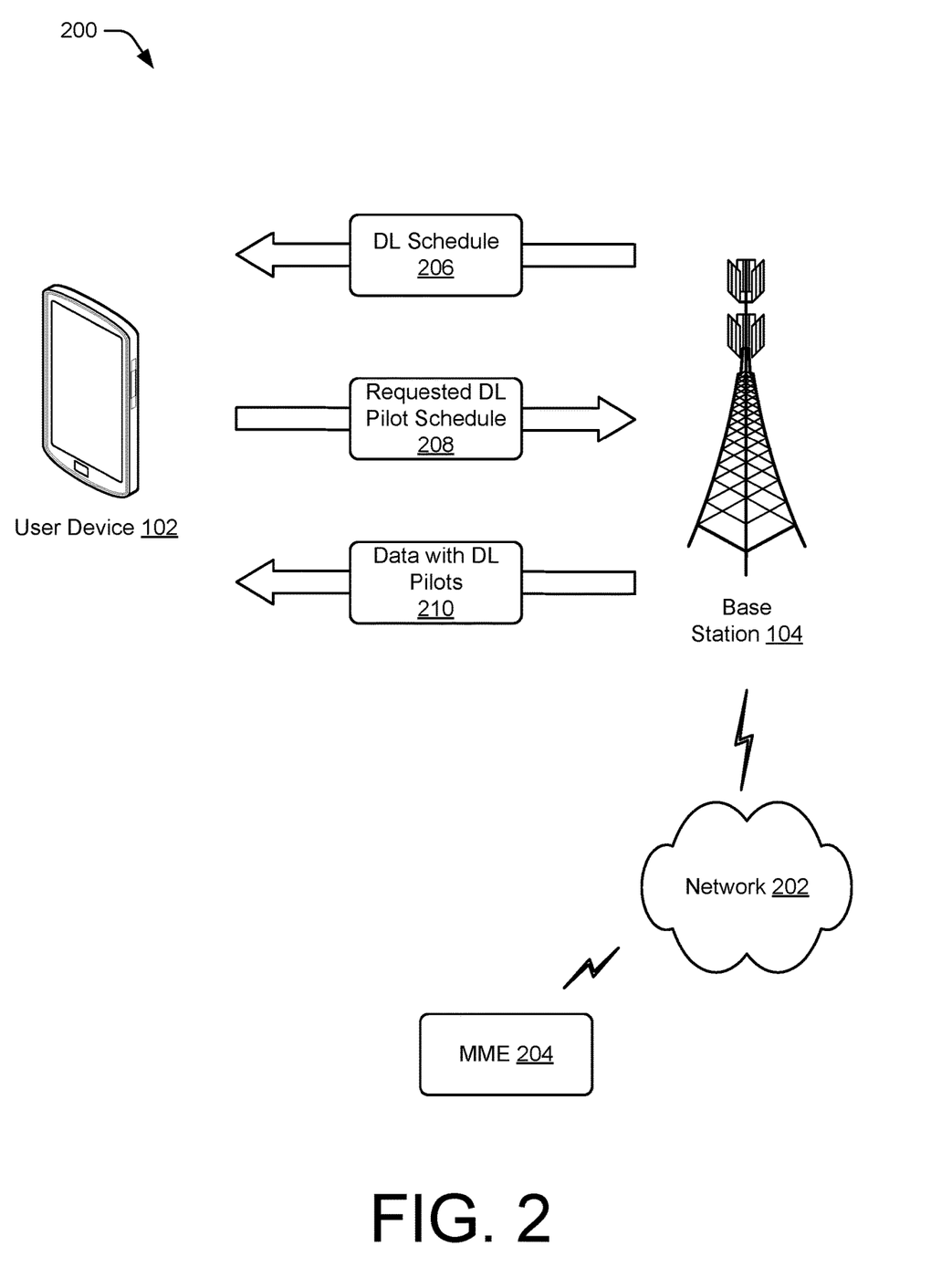
FIG. 2 illustrates an example networking environment in which the user device and base station may communicate in accordance with one or more aspects of user device-requested downlink pilots.

FIG. 2 illustrates an example networking environment 200 in which a user device and a base station may communicate in accordance with one or more aspects. The network environment includes respective instances of the user device 102 and the base station 104, which provides a wireless network with which the user device 102 and other user devices may associate. Through the wireless network, the base station 104 may enable or provide access to other networks or resources, such as a network 202 (e.g., the Internet) connected via a backhaul link (e.g., fiber network). Alternately or additionally, the networking environment 200 may include other base stations or a mobility management entity (MME) 204 to provide an area wide wireless network, such as a 5G NR network and associated data services.

The user device 102 and/or the base station 104 may communicate through any suitable type or combination of channels, message exchanges, or network management procedures. For example, the user device 102 and the base station 104 may communicate via one or more of a physical uplink control channel (PUCCH), a physical HARQ indicator channel (PHICH), a physical uplink share channel (PUSCH), or a PDSCH. The base station 104 determines a schedule of communication resources for one or more channels to be used to communicate with the user device 102. After determining the schedule, the base station transmits the schedule, including a downlink schedule 206, to the user device 102.

The user device 102 receives the downlink schedule 206 and configures a communication module to receive data at the resources identified in the downlink schedule 206. The user device 102 may analyze the downlink schedule 206 and determine a downlink pilot schedule to request downlink pilots be sent with data during the scheduled downlink. A requested downlink (DL) pilot schedule 208 is transmitted to the base station 104 to request characteristics of downlink pilots to be transmitted with the data by the base station 104. The requested downlink pilot schedule 208 may be based on successes of decoding previously received data based with previously received downlink pilots. For example, the requested downlink pilot schedule 208 may include additional downlink pilots if the previously received downlink pilots were insufficient for the user device 102 to successfully estimate the channel over which the previously received data was received. Additionally or alternatively, the requested downlink pilot schedule may be based on a current signal strength of a wireless connection between the user device 102 and the base station 104. In this example, the user device 102 may request additional downlink pilots to better estimate the wireless connection with a low signal strength.

The base station 104 receives the requested downlink pilot schedule 208 and determines a transmission downlink pilot schedule. In some instances, the base station 104 may simply adopt the requested downlink pilot schedule 208. Alternatively, the base station 104 may modify the requested downlink pilot schedule 208 based on scheduling constraints, as determined by the resource manager 126. The base station 104 then transmits the data with downlink (DL) pilots 210 to the user device 102 with the downlink pilots on the transmission downlink pilot schedule.

The user device 102 uses one or more of the downlink pilots to estimate the channel over which the data is sent and to assist in decoding the data. Based on decoding the data, the user device 102 may determine another downlink pilot schedule to request from the base station 104 for future data. For example, the user device 102 may request an increase or a decrease of a transmission power level for the downlink pilots. The user device 102 may transmit the other downlink pilot schedule to the base station 104. The other downlink pilot schedule may be referenced as an update to the requested downlink pilot schedule 208. The user device 102 may transmit updates to the requested downlink pilot schedule 208 on predefined time intervals or based on decoding error rates of data received by the user device 102.

Figure 3:
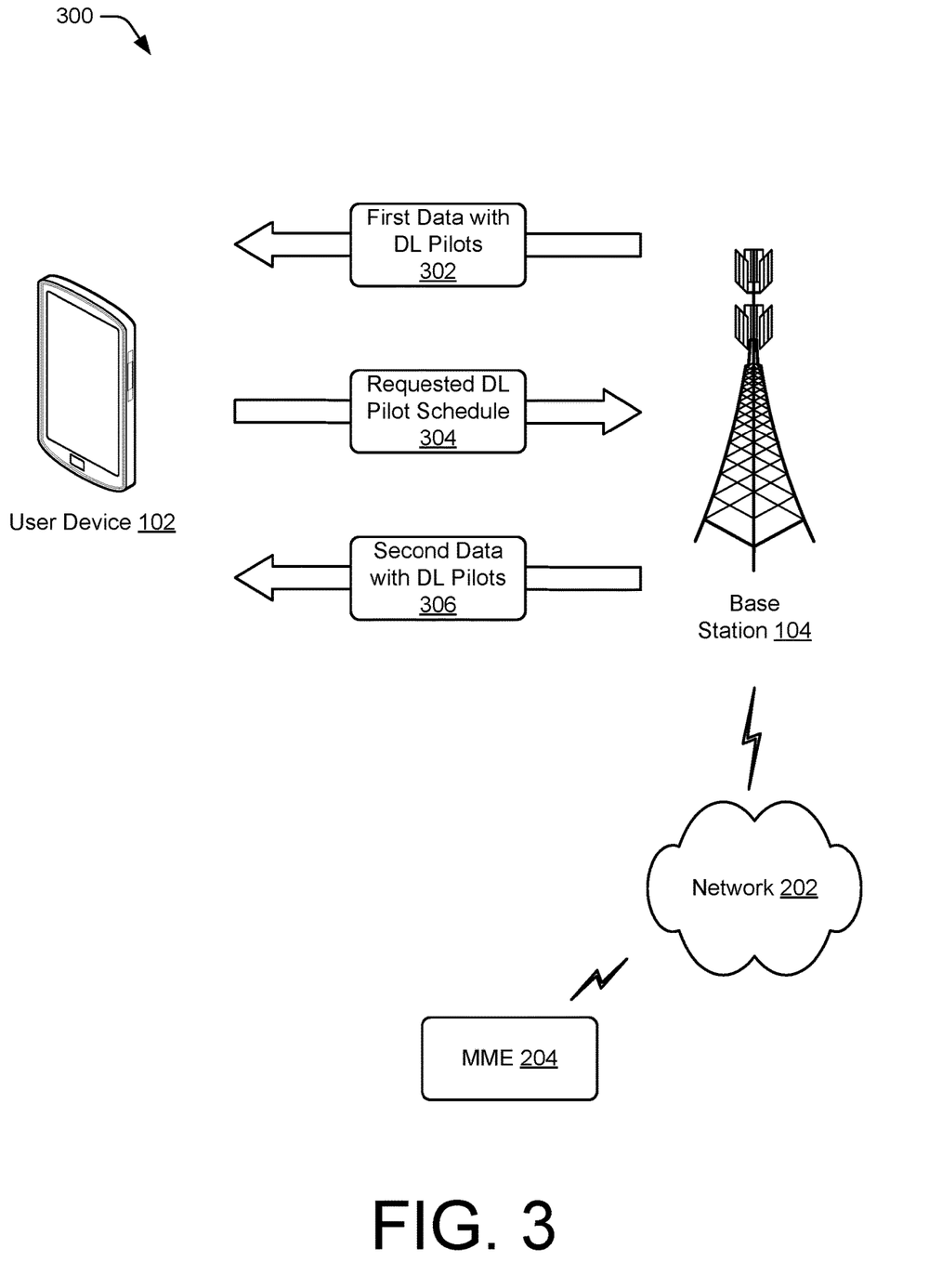
FIG. 3 illustrates another example networking environment in which the user device and base station may communicate in accordance with one or more aspects of user device-requested downlink pilots.

FIG. 3 illustrates an example networking environment 300 in which a user device and a base station may communicate in accordance with one or more aspects. The networking environment 300 includes respective instances of the user device 102, the base station 104, the network 202, and the MME 204.

In this example, the base station 104 transmits, to the user device 102, first data with downlink (DL) pilots 302. The user device 102 receives the first data with downlink pilots 302 over a channel of the wireless connection 106 according to a scheduled downlink. The downlink pilots are transmitted at frequency-time positions, at a transmission power level, and on spatial layers according to a downlink pilot schedule.

The user device 102 uses the downlink pilots to estimate the channel and decode the first data. Some of the first data may be successfully decoded, while other portions of the first data are unsuccessfully decoded. The user device 102 analyzes the decoding to determine if a modification to the downlink pilot schedule would improve decoding of data to be received from the base station 104. As discussed herein, the modifications may include one or more of increasing a transmission power, changing a position in the frequency-time domain, changing a frequency density, changing a time density, changing spatial layers, or changing spatial layer density of the downlink pilots.

Based on the analysis, the user device 102 transmits an indicator of a requested downlink (DL) pilot schedule 304 to the base station. For example, the indicator may include signals that specify requested characteristics of downlink pilots, such as position, spatial layer, or transmission power. Alternatively, the indicator may request downlink pilots within a frequency range, within a time interval, at a time density, at a frequency density, at an increased transmission power, or at a decreased transmission power.

The base station 104 receives and analyzes the indicator of the requested downlink pilot schedule 304. Based on the indicator, the base station 104 can modify a downlink pilot schedule for transmitting future data to the user device 102. However, in some instances, the base station 104 may also modify the requested downlink pilot schedule 304 based on scheduling constraints. The base station 104 then transmits second data with downlink (DL) pilots 306. In some implementations, the base station 104 transmits the second data with downlink pilots 306 having a modified downlink pilot schedule during a predetermined time slot. For example, the predetermined time slot may be determined based on a time slot interval, such as 4 or 6, after the transmission of the requested downlink pilot schedule.

When the wireless connection includes beamforming by the base station, such as with a 5G NR protocol, the second data with downlink pilots 306 are beamformed to the user device 102. Additionally, when beamforming on multiple spatial layers, downlink pilots on one spatial layer can be beamformed independently from downlink pilots on a second spatial layer.

Figure 4:
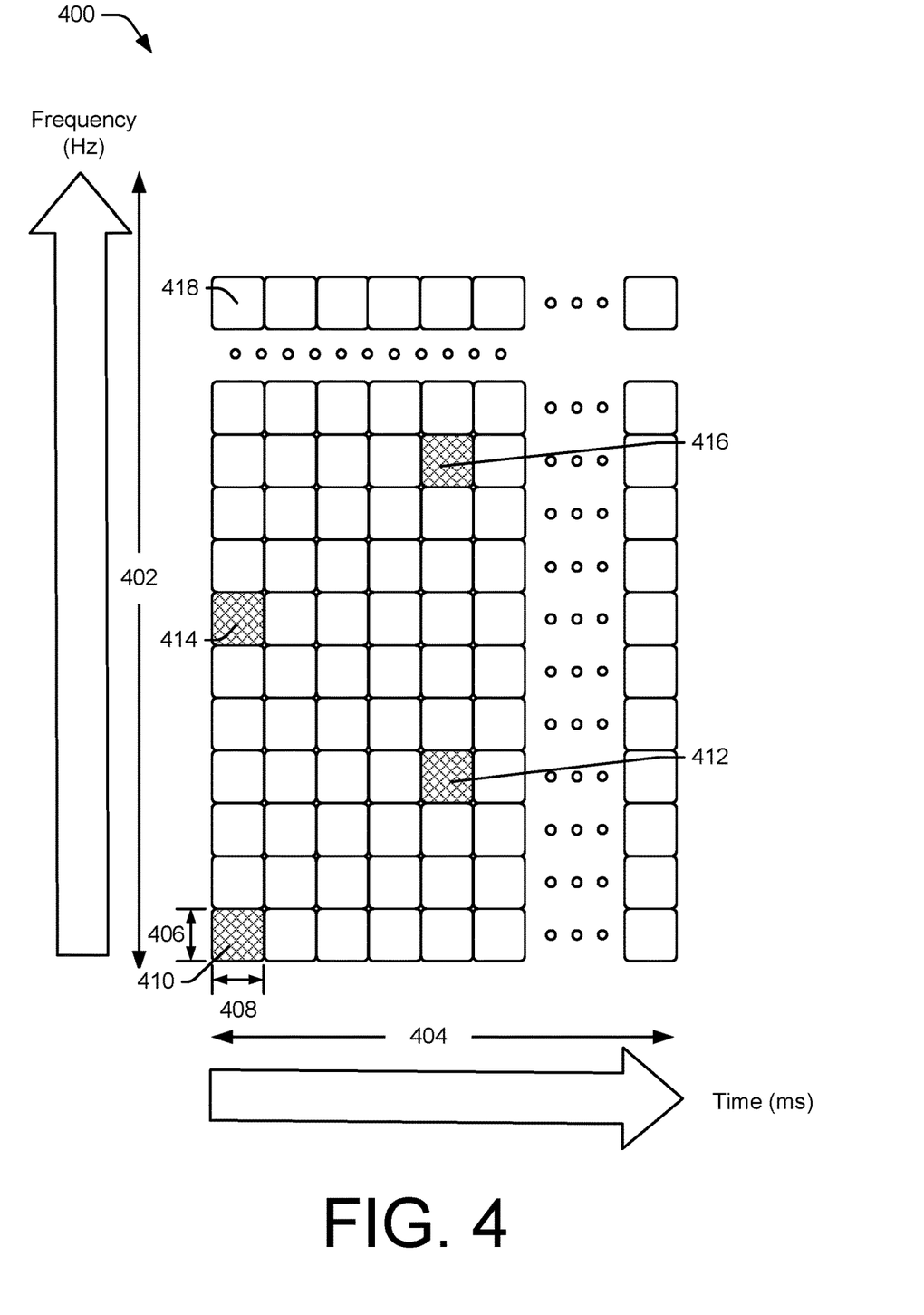
FIG. 4 illustrates an example set of resources available to a base station for communication with a user device.

FIG. 4 illustrates an example set 400 of resources available to the base station 104 for communication with the user device 102 over the wireless connection 106. The set 400 of resources spans a frequency-time domain that spans a frequency bandwidth 402 and a time interval 404. Resources of the set 400, as defined by a communication protocol or standard, span a specified frequency range 406 and a time interval 408. The resources, shown as boxes, may be resource blocks, resource elements, orthogonal frequency-division multiplexing (OFDM) symbols, or single-carrier frequency-division multiplexing (SC-FDM) symbols.

Resources 410, 412, 414, and 416 include downlink pilots for assisting the user device 102 in decoding data transmitted via the set 400 of resources. For example, the downlink pilots can be used by the user device 102 to estimate a channel over which the set 400 of resources are transmitted. With the channel properly estimated, the user device 102 can decode, including demodulate, data carrying signals with improved accuracy. For example, the user device 102 can estimate the channel to improve decoding by determining symbol timing, synchronizing carrier frequency, or synchronizing a sampling clock.

In an example implementation, the resources of the set 400 are resource elements through which the base station 104 transmits discrete data packets to the user device 102. The downlink pilots of the resources 410, 412, 414, and 416 include pilot sequences that convey decoding information that is usable by the user device 102 to decode data transmitted via other resource elements of the set 400 of resources. The downlink pilots of the resources 410, 412, 414, and 416 are spaced within the set 400 to pilot other resource elements at various positions in the frequency-time domain. However, some resources, such as resource 418, are at a position that is far from any downlink pilots. The user device 102 may have difficulty estimating a portion of the channel that includes the resource 418, and may therefore have difficulty properly decoding data packets transmitted over the resource 418.

Figure 5:
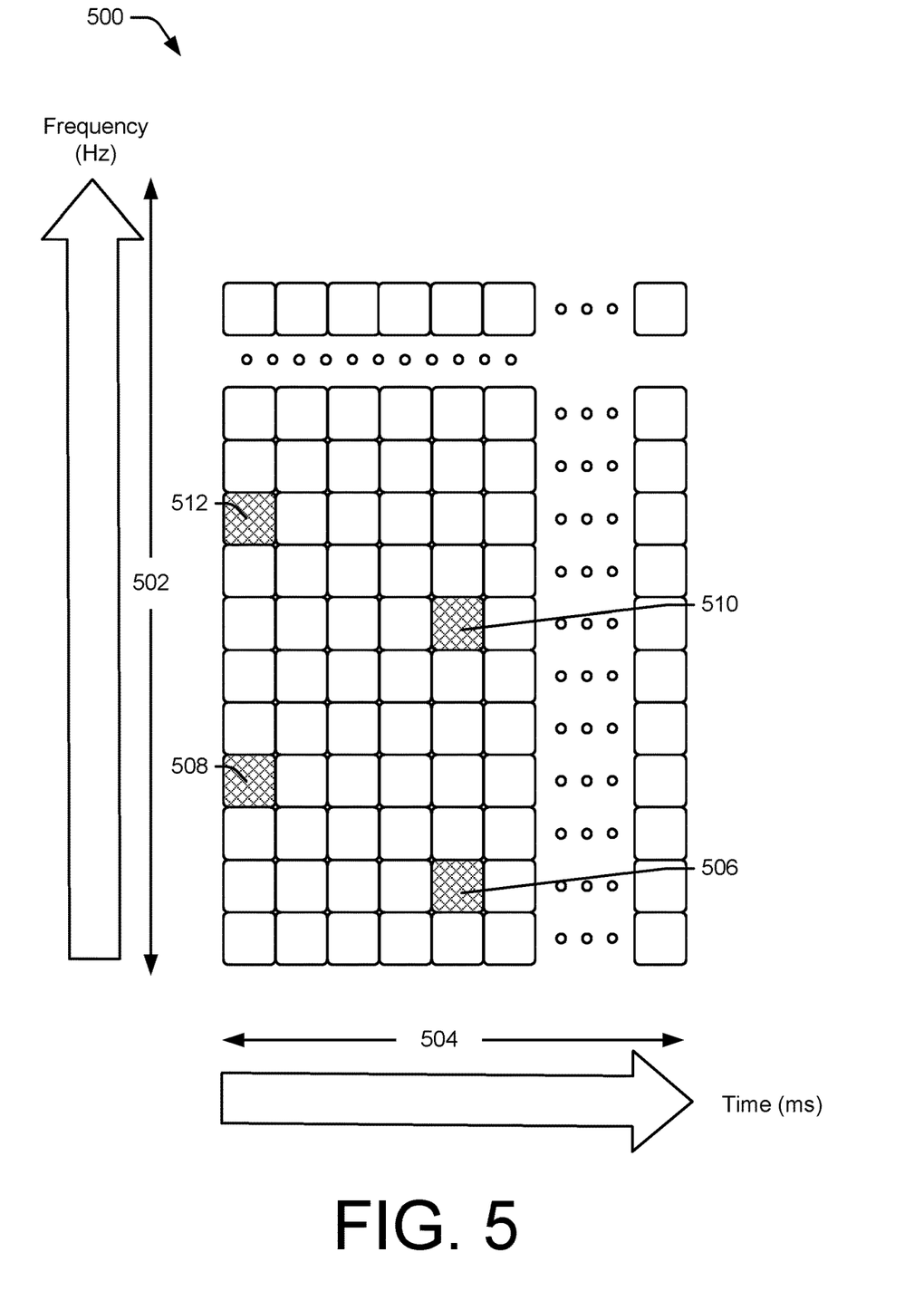
FIG. 5 illustrates another example set of resources available to a base station for communication with a user device.

FIG. 5 illustrates an example set 500 of resources available to the base station 104 for communication with the user device 102 over the wireless connection 106. The set 500 of resources spans a frequency-time domain that spans a frequency bandwidth 502 and a time interval 504. Resources of the set 500, as defined by a communication protocol or standard, span a specified frequency range and a time interval. The set 500 includes resources 506, 508, 510, and 512 through which the base station 104 transmits downlink pilots to assist the user device 102 in decoding data transmitted via the set 500 of resources.

In an example implementation, the user device 102 receives data from the base station 104, including downlink pilots, according to a schedule illustrated in FIG. 4. The user device 102 unsuccessfully decodes data transmitted via the resource 418 because the user device 102 does not successfully estimate the portion of the channel that includes the resource 418. Based on unsuccessfully decoding the data transmitted via the resource 418, the user device 102 determines a downlink pilot schedule to improve estimation of the portion of the channel that includes the resource 418. The user device 102 then transmits the requested downlink pilot schedule, or an indicator of such, to the base station 104.

FIG. 5 is an example of a transmission downlink pilot schedule in response to the base station 104 receiving the requested downlink pilot schedule. As illustrated, the downlink pilot schedule has been modified from that of FIG. 4 by repositioning the resources 506, 508, 510, and 512 that facilitate transmission of downlink pilots. These resources have been repositioned along the frequency bandwidth 502 of the set 500 to improve, for example, estimation of portions of the channel including the set 500 that had previously been improperly estimated. Alternatively, the resources may have been repositioned along the frequency bandwidth 502 of the set 500 to improve estimation of portions of the channel including the set 500 that are expected to be more difficult to estimate. In some implementations, the resources 506, 508, 510 and 512 are repositioned along one or both of the time interval 604 or the frequency bandwidth 602 to improve estimation of portions of the channel.

Figure 6:
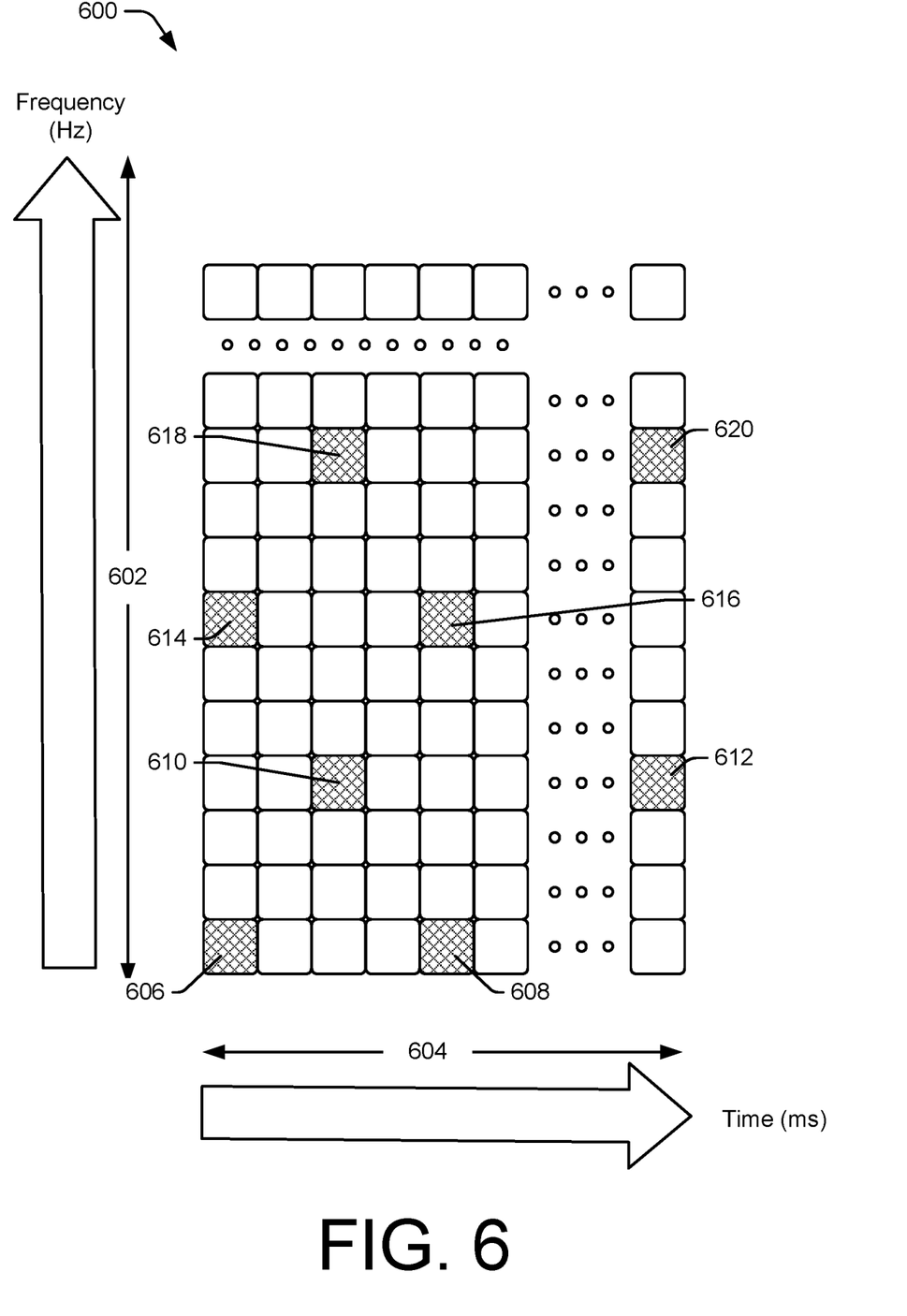
FIG. 6 illustrates another example set of resources available to a base station for communication with a user device.

FIG. 6 illustrates an example set 600 of resources available to the base station 104 for communication with the user device 102 over the wireless connection 106. The set 600 of resources spans a frequency-time domain that spans a frequency bandwidth 602 and a time interval 604. Resources of the set 600, as defined by a communication protocol or standard, span a specified frequency range and a time interval. The set 600 includes resources 606, 608, 610, 612, 614, 616, 618, and 620 through which the base station 104 transmits downlink pilots to assist the user device 102 in decoding data transmitted via the set 600 of resources.

In an example implementation, the user device 102 receives data from the base station 104, including downlink pilots, according to a schedule illustrated in FIG. 4. The user device 102 unsuccessfully decodes data transmitted via one or more of the resources because the user device 102 does not successfully estimate one or more portions of the channel based at least in part on distance, in the time interval 604, from the downlink pilots transmitted via the resources 410, 412, 414, and 416. Based on unsuccessfully decoding the data, the user device 102 determines a downlink pilot schedule to improve estimation the channel by increasing a density of downlink pilots in the time domain. The user device 102 then transmits the requested downlink pilot schedule, or an indicator of such, to the base station 104.

FIG. 6 is an example of a transmission downlink pilot schedule in response to the base station 104 receiving the requested downlink pilot schedule. As illustrated, the downlink pilot schedule has been modified from that of FIG. 4 by increasing, in the time domain, a density of resources that facilitate transmission of downlink pilots. These modifications may improve estimation of portions of the channel including the set 600 that had previously been improperly estimated. Alternatively, the modifications may improve estimation of portions of the channel including the set 600 that are expected to be more difficult to estimate. For example, the user device 102 may determine that it is far from the base station 104, which can result in an increase amount of interference, and that an increased frequency of downlink pilots may improve channel estimation. Additionally or alternatively, the user device 102 may determine that the user device 102 is moving relative to the base station 104, and would therefore benefit from an increased frequency of downlink pilots for channel estimation.

The user device 102 may balance benefits of improving channel estimation with a decrease in available resources for receiving other data from the base station. As illustrated, with an increased frequency of downlink pilots, fewer other resources are available to carry other data, such as application data. Therefore, the user device 102 may transmit an update to the requested downlink pilot schedule to reduce a frequency of downlink pilots if some of the downlink pilots are determined to be unnecessary for successful estimation of the channel.

Figure 7:
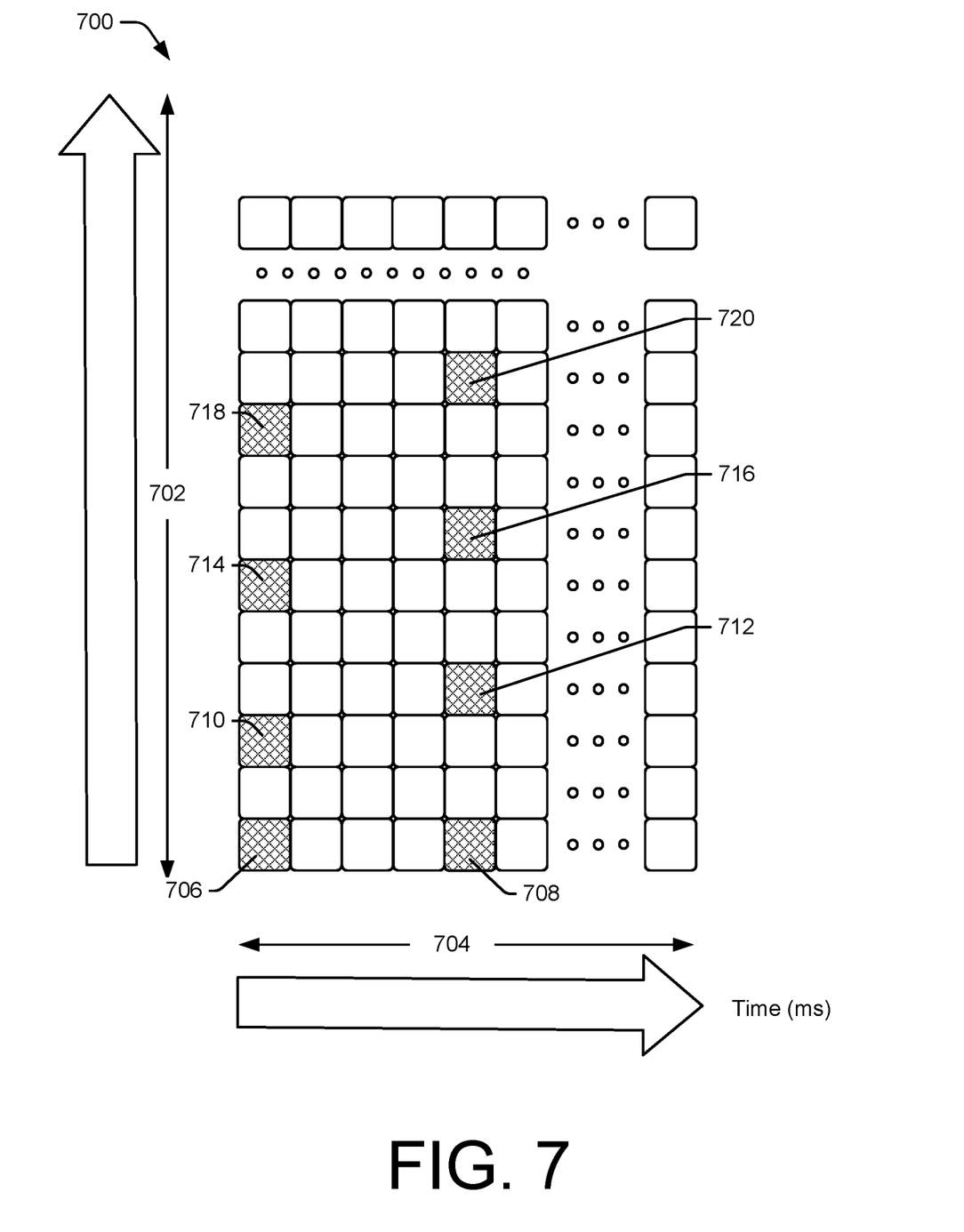
FIG. 7 illustrates another example set of resources available to a base station for communication with a user device.

FIG. 7 illustrates an example set 700 of resources available to the base station 104 for communication with the user device 102 over the wireless connection 106. The set 700 of resources spans a frequency-time domain that spans a frequency bandwidth 702 and a time interval 704. Resources of the set 700, as defined by a communication protocol or standard, span a specified frequency range and a time interval. The set 700 includes resources 706, 708, 710, 712, 714, 716, 718, and 720 through which the base station 104 transmits downlink pilots to assist the user device 102 in decoding data transmitted via the set 700 of resources.

In an example implementation, the user device 102 receives data from the base station 104, including downlink pilots, according to a schedule illustrated in FIG. 4. The user device 102 unsuccessfully decodes data transmitted via one or more of the resources because the user device 102 does not successfully estimate one or more portions of the channel based at least in part on distance, in the frequency bandwidth 702, from the downlink pilots transmitted via the resources 410, 412, 414, and 416. Based on unsuccessfully decoding the data, the user device 102 determines a downlink pilot schedule to improve estimation the channel by increasing a density of downlink pilots in the frequency domain. The user device 102 then transmits the requested downlink pilot schedule, or an indicator of such, to the base station 104.

Figure 8:
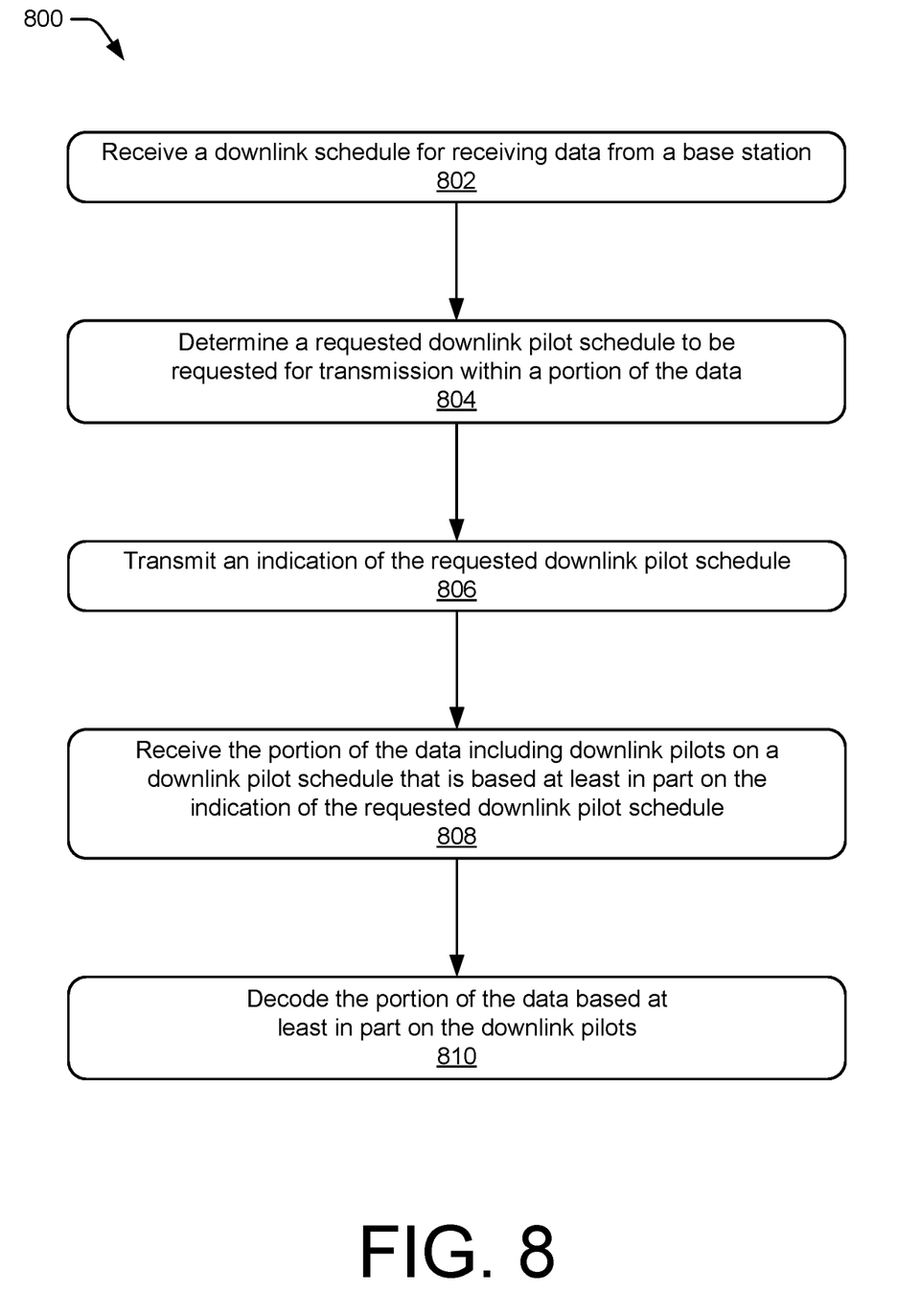
FIG. 8 illustrates an example method performed by a user device for user device-requested downlink pilots.
Figure 9:
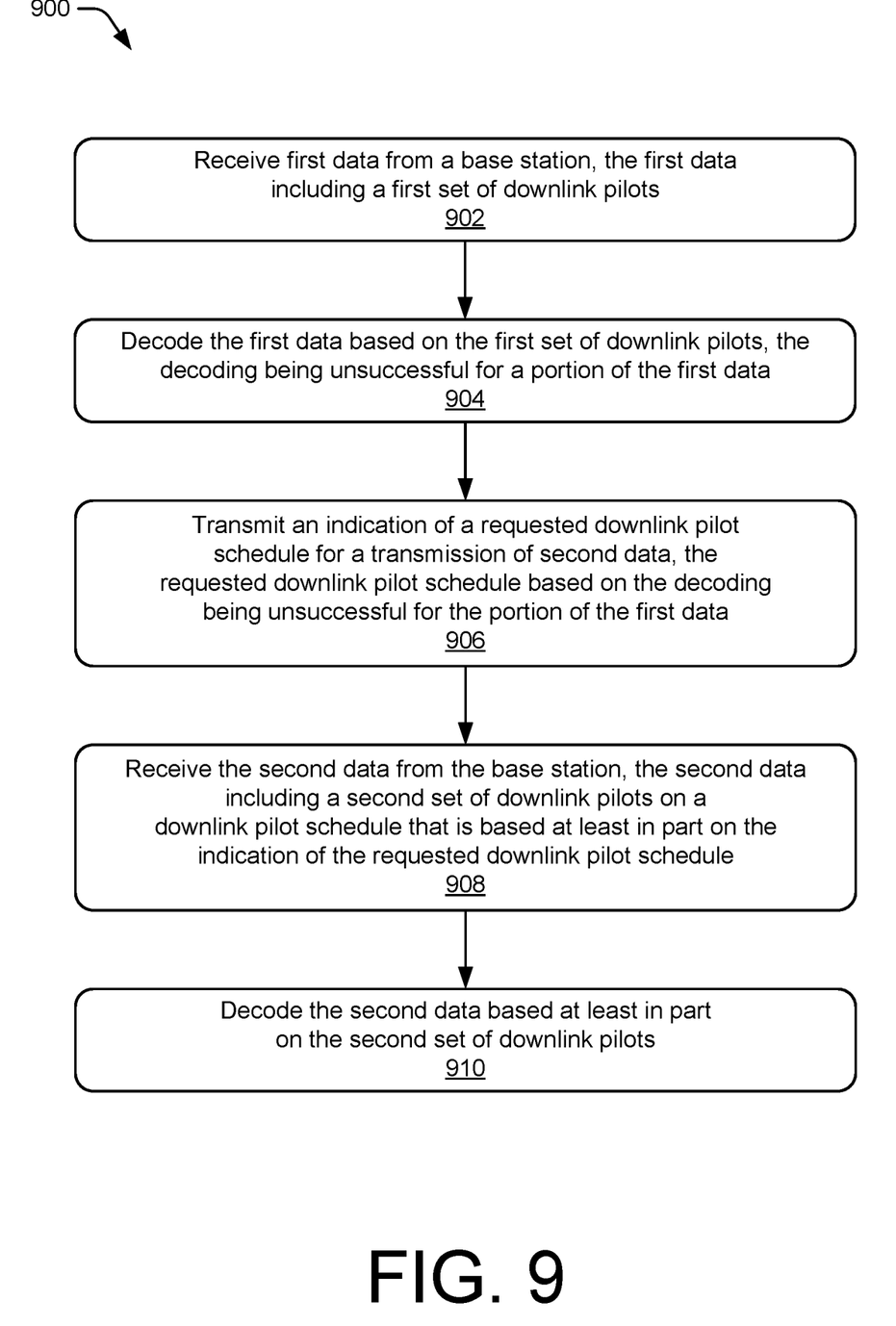
FIG. 9 illustrates another example method performed by a user device for user device-requested downlink pilots.
Figure 10:
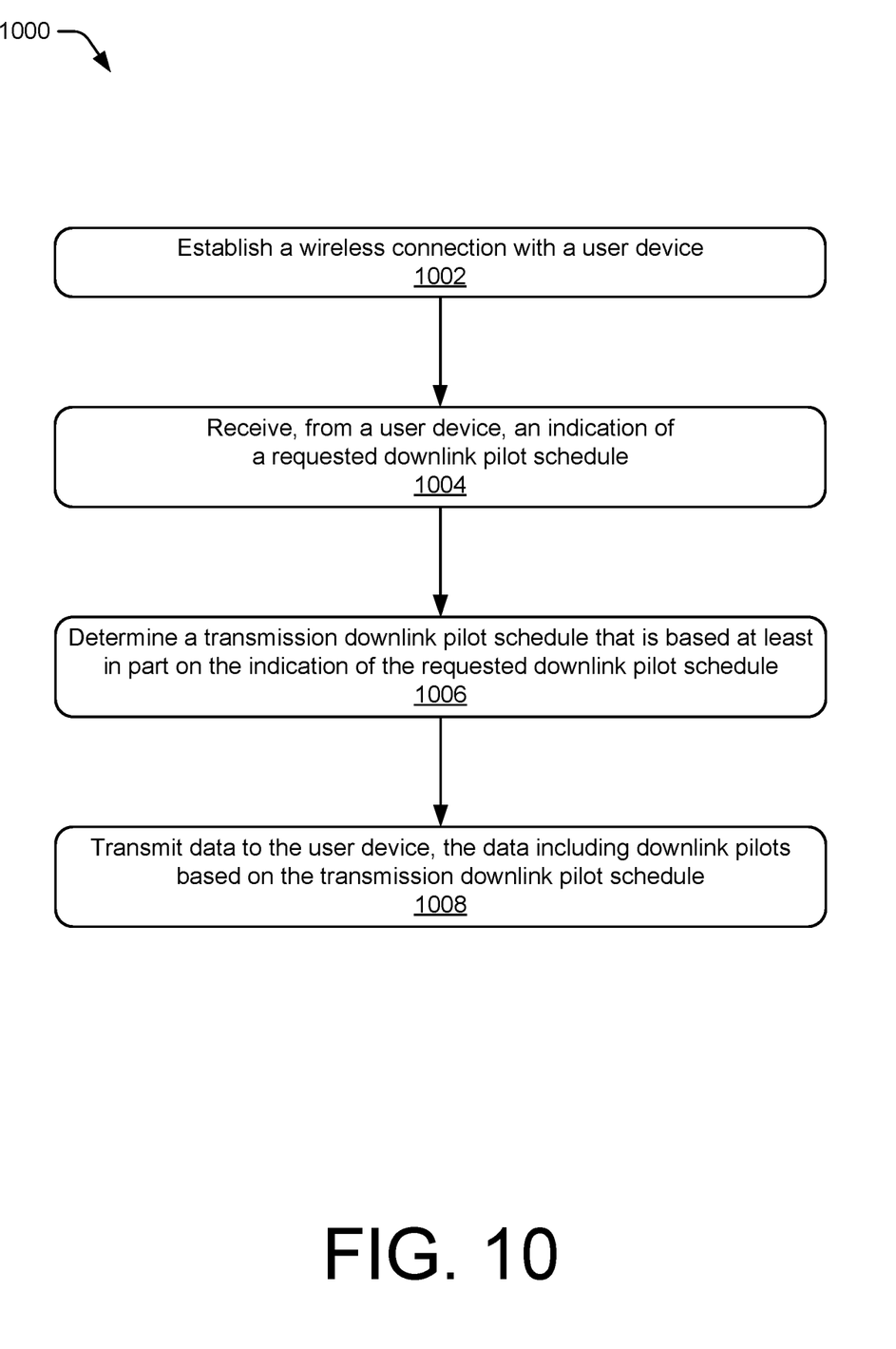
FIG. 10 illustrates an example method performed by a base station for user device-requested downlink pilots.

FIG. 7 is an example of a transmission downlink pilot schedule in response to the base station 104 receiving the requested downlink pilot schedule. As illustrated, the downlink pilot schedule has been modified from that of FIG. 4 by increasing, in the frequency domain, a density of resources that facilitate transmission of downlink pilots. These modifications may improve estimation of portions of the channel including the set 700 that had previously been improperly estimated. Alternatively, the modifications may improve estimation of portions of the channel including the set 700 that are expected to be more difficult to estimate. For example, the user device 102 may determine that it is far from the base station 104, which can result in an increase amount of interference, and that in increased quantity of downlink pilots may improve channel estimation. Additionally or alternatively, the user device 102 may determine that the set 700 spans a large range of frequencies and would therefore benefit from an increased frequency density of downlink pilots for channel estimation. As discussed above, the user device 102 may transmit an update to the requested downlink schedule to reduce a quantity of downlink pilots if some of the downlink pilots are determined to be unnecessary for successful estimation of the channel. Successful estimation of the channel may be based on meeting a threshold quantity or proportion of successfully decoded data packets transmitted over the channel Techniques for Implementing Device-Requested Downlink Pilots FIGS. 8-10 depict methods for implementing device-requested downlink pilots in wireless networks. These methods are shown as sets of blocks that specify operations performed but are not necessarily limited to the order or combinations shown for performing the operations by the respective blocks. For example, operations of different methods may be combined, in any order, to implement alternate methods without departing from the concepts described herein. In portions of the following discussion, the techniques may be described in reference to FIGS. 1-7, reference to which is made for example only. The techniques are not limited to performance by one entity or multiple entities operating on one device, or those described in these figures.

FIG. 8 illustrates an example method 800 performed by a user device for user device-requested downlink pilots. The method 800 includes operations that may be performed by a signal analysis module, such as the signal analysis module 116, a downlink pilot module 118, and a communication module, such as the communication module 120. In some aspects, operations of the method 800 may improve decoding success rates by improving channel estimation of a channel over which the user device-requested downlink pilots are received by the user device 102.

At operation 802, a user device receives a downlink schedule for receiving data from a base station. For example, the user device 102 receives, via a transceiver of the communication module 120, the downlink schedule 206 over the wireless connection 106. The downlink schedule may include a set of resources, such as the set 400, over which the user device 102 may receive data from the base station 104. The downlink schedule may include scheduled positions of downlink pilots, such as in the resources 410, 412, 414, and 416, or may request the user device 102 to propose a downlink pilot schedule.

At operation 804, the user device determines a requested downlink pilot schedule to be requested for transmission within a portion of the data to be received from the base station. For example, the user device 102 may request a downlink pilot schedule having specified characteristics such as proposed downlink pilot positions, a quantity of downlink pilots, a downlink pilot time density, a downlink pilot frequency density, frequency layers, or transmission power levels of downlink pilots. The characteristics may be independently defined, or may be defined relative to a proposed or previous downlink pilot schedule.

At operation 806, the user device transmits an indication of the requested downlink pilot schedule. For example, the user device 102 transmits, via the transceiver of the communication module 120, the requested downlink pilot schedule 208 to the base station 104. The base station 104 uses the requested downlink pilot schedule 208 to determine a downlink pilot schedule for transmission of future data.

At operation 808, the user device receives the portion of data including downlink pilots on a downlink pilot schedule that is based at least in part on the indication of the requested downlink pilot schedule. For example, the base station 104 can adopt the requested downlink pilot schedule 208 or may modify it based on resource scheduling constraints. The base station 104 then transmits, to the user device 102, the data with downlink pilots 210.

At operation 810, the user device decodes the portion of the data. The portion of the data is decoded based at least in part on the downlink pilots. For example, the user device 102 decodes data received over the set 500 of resources based at least in part on the pilots received over the resources 506, 508, 510, and 512.

FIG. 9 illustrates an example method 900 performed by a user device for user device-requested downlink pilots. The method 900 includes operations that may be performed by a signal analysis module, such as the signal analysis module 116, a downlink pilot module 118, and a communication module, such as the communication module 120. In some aspects, operations of the method 900 may improve decoding success rates by improving channel estimation of a channel over which the user device-requested downlink pilots are received by the user device 102.

At operation 902, a user device receives first data from a base station. The first data includes a first set of downlink pilots. For example, the user device 102 receives, via a transceiver of the communication module 120, the first data with downlink pilots 302 over the wireless connection 106. The first set of downlink pilots may be scheduled according to a first downlink schedule such as the set 400 of resources.

At operation 904, the user device decodes the first data based on the first set of downlink pilots with the decoding being unsuccessful for a portion of the first data. For example, the signal analysis module 116 decodes the first data using the first set of downlink pilots. The decoding may include demodulating signals carrying the first data using pilot sequences of the first set of downlink pilots. The signal analysis module 116 may determine which data packets of the first data were successfully decoded and which data packets were unsuccessfully decoded. The downlink pilot module 118 may use the determination of the signal analysis module 116 to generate a downlink pilot schedule to request from the base station 104.

At operation 906, the user device transmits an indication of a requested downlink pilot schedule for a transmission of second data. The requested downlink pilot schedule is based on the decoding being unsuccessful for the portion of the first data. For example, the user device 102 transmits, using a transceiver of the user device 102, the requested downlink pilot schedule 304 to the base station 104.

At operation 908, the user device receives, from the base station, the second data including a second set of downlink pilots that is based at least in part on the indication of the requested downlink pilot schedule. For example, the user device 102 receives the second data with downlink pilots 306 that are based on the requested downlink pilot schedule 304.

At operation 910, the user device decodes the second data. The second data is decoded based at least in part on the second set of downlink pilots. For example, the user device 102 decodes data received over the set 600 of resources based at least in part on the pilots received over the resources 606, 608, 610, 612, 614, 616, 618, and 620. FIG. 10 illustrates an example method 1000 performed by a base station for user device-requested downlink pilots. The method 1000 includes operations that may be performed by a resource manager, such as the resource manager 126, a downlink pilot manager 128, and a communication module, such as the communication module 130. In some aspects, operations of the method 1000 may improve decoding success rates by improving channel estimation of a channel over which the user device-requested downlink pilots are transmitted by the base station 104.

At operation 1002, a base station establishes a wireless connection with a user device. For example, the base station 104 establishes, via a transceiver of the communication module 130, the wireless connection 106 with the user device 102. The wireless connection 106 may include an advanced protocol, such as 5G NR. The wireless connection 106 may also involve beamforming by the base station 104.

At operation 1004, the base station receives, from the user device, an indication of a requested downlink pilot schedule. For example the base station 104 receives one of the requested downlink pilot schedules 208 or 304 from the user device 102.

At operation 1006, the base station determines a transmission downlink pilot schedule that is based at least in part on the indication of the requested downlink pilot schedule. For example the base station 104 may compare the requested downlink pilot schedule 208 or 304 with available resources for communication with the user device 102. The base station 104 may encounter scheduling restraints that prohibit the base station 104 from adopting the requested downlink pilot schedule 208 or 304. Additionally or alternatively, the indication of the requested downlink pilot schedule may provide characteristics of the downlink pilot schedule, such as a frequency density, that the base station 104 can use as criteria for scheduling downlink pilots in a frequency-time domain of the wireless connection 106.

At operation 1008, the user base station transmits, to the user device, the data including downlink pilots based at least in part on the downlink pilot schedule. For example, the base station 104 transmits the data with downlink pilots 210 or the second data with downlink pilots 306 to the user device 102. In some implementations, the base station transmits the data in a predetermined time slot relative to a transmission of the indication of the requested downlink pilot schedule. For example, the base station 104 transmits the data 4, 6, 8, or 10 time slots after transmission of the indication of the requested downlink pilot schedule. Additionally or alternatively, the base station 104 transmits the downlink pilots on multiple layers. In some cases, the base station 104 performs beamforming of downlink pilots on a first spatial layer independently from beamforming downlink pilots on a second spatial layer.

Although techniques using, and apparatuses for implementing, user device-requested downlink pilots have been described in language specific to features and/or methods, it is to be understood that the subject of the appended claims is not necessarily limited to the specific features or methods described. Rather, the specific features and methods are disclosed as example ways in which user device-requested downlink pilots can be implemented.

What is claimed is:

1. A method for requesting downlink (DL) pilots by a user device, the method comprising: receiving, via a transceiver of the user device and over a wireless connection, a DL schedule for receiving data from a base station; determining, based at least in part on the DL schedule, a requested DL pilot (DLP) schedule, the requested DLP schedule indicating requested DLPs for transmission within a portion of the data; transmitting, via the transceiver of the user device and over the wireless connection, an indication of the requested DLP schedule; receiving, via the transceiver of the user device and over the wireless connection, the portion of the data including one or more transmitted DLPs on a transmission DLP schedule, the transmission DLP schedule being based at least in part on the indication of the requested DLP schedule; and decoding the portion of the data, the decoding based at least in part on the one or more transmitted DLPs.

2. The method as recited in claim 1, wherein the indication of the requested DLP schedule includes a requested frequency range over which the user device requests the one or more DLPs to be transmitted.

3. The method as recited in claim 1, wherein the indication of the requested DLP schedule includes a requested DLP frequency density within a frequency range of the wireless connection.

4. The method as recited in claim 1, wherein the indication of the requested DLP schedule includes a requested DLP time density within a time domain of the wireless connection.

5. The method as recited in claim 1, wherein the indication of the requested DLP schedule includes a requested quantity of spatial layers of the wireless connection over which the one or more DLPs are requested by the user device to be transmitted.

6. The method as recited in claim 1, wherein the indication of the requested DLP schedule includes a requested transmission power level for transmitting the one or more DLPs.

7. The method as recited in claim 6, wherein an increased transmission power level for the one or more DLPs causes a decreased transmission power level for transmitting other data of the portion of the data.

8. The method as recited in claim 1, wherein the one or more DLPs include one or more demodulation reference signals (DM-RS) usable by the user device to estimate a channel over which the user device receives the portion of the data including the one or more DLPs.

9. The method as recited in claim 1, wherein the one or more DLPs include one or more channel state reference signals (CS-RS) usable by the user device to estimate a channel over which the user device receives the portion of the data including the one or more DLPs.

10. A user device comprising: a processor; a hardware-based transceiver; and a computer-readable storage medium having stored thereon instructions that, responsive to execution by the processor, cause the processor to perform operations comprising: receiving, via the hardware-based transceiver and over a wireless connection, first data from a base station, the first data including a first set of downlink pilots (DLPs); decoding the first data based at least in part on the first set of DLPs, the decoding being unsuccessful for a portion of the first data; transmitting, via the hardware-based transceiver of the user device and to a base station over the wireless connection, an indication of a requested DLP schedule for a transmission of second data, the requested DLP schedule based at least in part on the decoding being unsuccessful for the portion of the first data; receiving, via the hardware based transceiver of the user device and over the wireless connection, the transmission of the second data from the base station, the second data including a second set of DLPs on a DLP schedule that is based at least in part on the indication of the requested DLP schedule; and decoding the second data, the decoding based at least in part on the second set of DLPs.

11. The user device as recited in claim 10, wherein the first set of DLPs includes a first quantity of DLPs that is less than a second quantity of DLPs of the second set of DLPs.

12. The user device as recited in claim 10, wherein the first set of DLPs includes first DLPs at frequencies that are different from frequencies of second DLPs of the second set of DLPs.

13. The user device as recited in claim 10, wherein the first set of DLPs includes first DLPs at different spatial layers than second DLPs of the second set of DLPs.

14. The user device as recited in claim 10, wherein the first set of DLPs includes first DLPs at different positions in a time domain than second DLPs of the second set of DLPs.

15. The user device as recited in claim 10, wherein the first set of DLPs includes first DLPs transmitted at different power levels than second DLPs of the second set of DLPs.

16. A method for transmitting downlink (DL) pilots performed by a base station of a wireless network, the method comprising: establishing, via a transceiver, a wireless connection with a user device; receiving, from the user device, an indication of a requested DL pilot (DLP) schedule; determining a transmission DLP schedule, the transmission DLP schedule based at least in part on the indication of the requested DLP schedule; and transmitting, via the transceiver, data to the user device, the data including transmitted DLPs based at least in part on the transmission DLP schedule.

17. The method as recited in claim 16, wherein the base station beamforms the data, including the transmitted DLPs, to the user device.

18. The method as recited in claim 17, wherein: the base station beamforms a first DLP of the transmitted DLPs on a first spatial layer; and the base station beamforms, independently from beamforming the first DIP, a second DLP of the transmitted DLPs on a second spatial layer.

19. The method as recited in claim 17, wherein the transmission DLP schedule is different from the requested DLP schedule based at least in part on scheduling constraints.

20. The method as recited in claim 17, wherein one or more of the DLPs includes a pilot sequence that is scrambled with an identity of the user device.

21. A base station comprising: a processor; a hardware-based transceiver; and a computer-readable storage medium having stored thereon instructions that, responsive to execution by the processor, cause the processor to perform operations comprising: establishing, via the hardware-based transceiver, a wireless connection with a user device; receiving, from the user device, an indication of a requested downlink pilot (DLP) schedule; determining a transmission DLP schedule, the transmission DLP schedule based at least in part on the indication of the requested DLP schedule; and transmitting, via the hardware-based transceiver, data to the user device, the data including transmitted DLPs based at least in part on the transmission DLP schedule.

22. The base station as recited in claim 21, wherein the base station beamforms the data, including the transmitted DLPs, to the user device.

23. The base station as recited in claim 21, wherein the transmission DLP schedule is different from the requested DLP schedule based at least in part on scheduling constraints.

24. The base station as recited in claim 21, wherein one or more of the DLPs includes a pilot sequence that is scrambled with an identity of the user device.

* * * * *

UNITED STATES PATENT AND TRADEMARK OFFICE
CERTIFICATE OF CORRECTION

PATENT NO. : 10,512,100 B2
APPLICATION NO. : 15/895540
DATED : December 17, 2019
INVENTOR(S) : Jibing Wang and Erik Richard Stauffer Page 1 of 1

It is certified that error appears in the above-identified patent and that said Letters Patent is hereby corrected as shown below:

Column 15, Line 60, in Claim 10, after "the" before "transceiver" delete "hardware based" insert --hardware-based--

Column 16, Line 34, in Claim 18, after "first" before "a" delete "DIP," and insert --DLP,--

Signed and Sealed this
Fourth Day of February, 2020

Andrei Iancu
*Director of the United States Patent and Trademark Office*